United States Patent
Gao et al.

(10) Patent No.: US 9,671,211 B2
(45) Date of Patent: Jun. 6, 2017

(54) METHOD AND APPARATUS FOR MEASURING LINEAR DISPLACEMENT

(75) Inventors: Li Gao, Katy, TX (US); Jeffrey L. Moore, Houston, TX (US); Jimmy W. Anders, Montgomery, TX (US); Michael T. Pelletier, Houston, TX (US)

(73) Assignee: Halliburton Energy Service, Inc., Houston, TX (US)

( * ) Notice: Subject to any disclaimer, the term of this patent is extended or adjusted under 35 U.S.C. 154(b) by 0 days.

(21) Appl. No.: 13/809,398

(22) PCT Filed: Jul. 23, 2010

(86) PCT No.: PCT/US2010/043031
§ 371 (c)(1),
(2), (4) Date: Jan. 9, 2013

(87) PCT Pub. No.: WO2012/011918
PCT Pub. Date: Jan. 26, 2012

(65) Prior Publication Data
US 2013/0113468 A1    May 9, 2013

(51) Int. Cl.
| | |
|---|---|
| *G01V 3/26* | (2006.01) |
| *G01B 7/14* | (2006.01) |
| *E21B 47/09* | (2012.01) |
| *G01B 7/00* | (2006.01) |
| *G01D 5/14* | (2006.01) |
| *E21B 49/08* | (2006.01) |

(52) U.S. Cl.
CPC ............... *G01B 7/14* (2013.01); *E21B 47/09* (2013.01); *E21B 49/08* (2013.01); *G01B 7/003* (2013.01); *G01D 5/145* (2013.01)

(58) Field of Classification Search
CPC ........................................................ G01V 3/26
USPC ............................................. 324/207.24, 346
See application file for complete search history.

(56) References Cited

U.S. PATENT DOCUMENTS

| | | | |
|---|---|---|---|
| 5,666,050 A | 9/1997 | Bouldin et al. | |
| 6,339,886 B1 * | 1/2002 | Reinhardt | ..................... 33/544.2 |
| 7,155,990 B2 | 1/2007 | Gilbert et al. | |
| | (Continued) | | |

FOREIGN PATENT DOCUMENTS

| | | |
|---|---|---|
| DE | 3833399 A1 | 4/1990 |
| GB | 2389659 A | 12/2003 |
| WO | WO-2012011918 A1 | 1/2012 |

OTHER PUBLICATIONS

"International Application Serial No. PCT/US2010/043031, Search Report mailed Sep. 16, 2010", 4 pgs.

(Continued)

*Primary Examiner* — Bot Ledynh
(74) *Attorney, Agent, or Firm* — Gilliam IP PLLC (57) ABSTRACT

For some embodiments, a system includes a moveable structure, moveable in at least a linear direction relative to a supporting structure, a magnetic field sensor assembly including a magnetic field sensor, and a magnet, wherein one of the magnet and the magnetic field sensor is coupled to the moveable structure, and wherein the other of the magnet and the magnetic field sensor assembly is coupled to the supporting structure, and wherein the magnetic field sensor assembly is configured to determine the relative position of the magnet to the magnetic field sensor.

21 Claims, 6 Drawing Sheets

(56) References Cited

U.S. PATENT DOCUMENTS

| | | |
|---|---|---|
| 7,204,309 B2 * | 4/2007 | Segura et al. ............... 166/264 |
| 7,377,333 B1 | 5/2008 | Sugiura |
| 7,637,316 B2 | 12/2009 | Best et al. |
| 2003/0010192 A1 | 1/2003 | Rollgardh |
| 2004/0095218 A1 | 5/2004 | Wan et al. |
| 2007/0216401 A1 * | 9/2007 | Baak et al. ............. 324/207.24 |
| 2007/0262770 A1 | 11/2007 | Arns, Jr. et al. |
| 2009/0128141 A1 | 5/2009 | Hopmann et al. |
| 2010/0090692 A1 | 4/2010 | Itoi et al. |
| 2012/0118040 A1 * | 5/2012 | DiFoggio et al. ........... 73/23.35 |

OTHER PUBLICATIONS

"International Application Serial No. PCT/US2010/043031, Written Opinion mailed Sep. 16, 2010", 6 Pgs.
"International Application Serial No. PCT/US2010/043031, International Preliminary Report on Patentability mailed Jan. 31, 2013", 8 pgs.
"Singapore Application Serial No. 201300312-4, Search Report mailed May 9, 2014", 8 pgs.
"Singapore Application Serial No. 201300312-4, Written Opinion mailed May 9, 2014", 10 pgs.
"Singapore Application Serial No. 201300312-4, Examination Report mailed Dec. 12, 2014", 11 pgs.

* cited by examiner

METHOD AND APPARATUS FOR MEASURING LINEAR DISPLACEMENT

RELATED APPLICATIONS

This application is a U.S. National Stage Filing under 35 U.S.C. 371 from International Application No. PCT/US2010/043031, filed on 23 Jul. 2010, and published as WO 2012/011918 A1 on 26 Jan. 2012, which application and publication are incorporated herein by reference in their entirety.

FIELD

The present disclosure relates to methods and apparatus for measuring relative placement between objects and, more particularly, to methods and apparatus using magnetic sensors to determine relative placement of one object to another, such as displacement of one portion of a device relative to another portion.

BACKGROUND

There are many applications in which there is a need to measure changes in the relative positioning between components. In many such applications, the components are readily accessible, and measurements can be made directly. However, in other situations, one or more of the components may not be readily accessible, and thus some mechanism for indirect measurement must be used. One example situation which presents specific difficulties is in tools that may be used in wells or other subsurface locations. For example, as some configurations of a downhole tool are operated within a well bore, various pistons and other moving parts may move relative other portions of the downhole tool. An example of one such moving part might be a piston within a chamber of the downhole tool, such as might be used, for example, for sampling fluids from the formation or well annulus. In this example, measurement of displacement of the piston relative to a surface of the chamber within which it is housed may provide useful information regarding the volume of that chamber, and therefore of the fluid therein.

One difficulty in this example operating environment is that the system needs to be operable, and generally stable, under elevated temperatures, and must be sufficiently rugged to withstand the downhole environment. These extreme conditions in a typical well bore make it difficult to provide tools that can properly determine relative positions of moving members downhole.

SUMMARY

In one aspect of the present disclosure, a system includes a moveable structure, moveable in at least a linear direction relative to a supporting structure, a magnetic field sensor assembly, including a magnetic field sensor, and a magnet, wherein one of the magnet and the magnetic field sensor is coupled to the moveable structure, and wherein the other of the magnet and the magnetic field sensor assembly is coupled to the supporting structure, and wherein the magnetic field sensor is adapted to determine the relative position of the magnet to the magnetic field sensor.

In one example, the system described above can include a chamber wherein there is a need to determine the volume occupied by a fluid within a variable volume portion of the chamber. One example of such a chamber is in a PVT (pressure/volume/temperature) measurement system within a downhole tool. Such a PVT measurement system includes a piston chamber, and a piston located within the chamber and movable within the chamber to vary a volume between the piston and an end wall of the piston chamber, wherein the magnet is located at the piston and the magnetic field sensor is located outside the piston chamber such that the magnetic field sensor is located to sense the location of the piston within the piston chamber to ascertain the volume of a sample fluid within the chamber. In any of the above examples, the magnetic field sensor can include an array of GMR (giant magnetoresistance) sensors.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

In the following discussion and in the claims, the terms "including" and "comprising" are used in an open-ended fashion, and thus should be interpreted to mean "including, but not limited to . . . ". Also, the terms "couple," "couples", and "coupled" used to describe any mechanical or electrical connections are each intended to mean and refer to either an indirect or a direct mechanical or electrical connection. Thus, for example, if a first device "couples" or is "coupled" to a second device, that interconnection may be through a mechanical connection and/or an electrical conductor directly interconnecting the two devices, or through an indirect mechanical or electrical connection through other intervening devices, conductors and connections. Further, reference to "up" or "down" are made for purposes of ease of description with "up" meaning towards the surface of the borehole and "down" meaning towards the bottom or distal end of the borehole. In addition, in the discussion and claims that follow, it may be sometimes stated that certain components or elements are in fluid communication. By this it is meant that the components are constructed and interrelated such that a fluid could be communicated between them, as via a passageway, tube, or conduit. Also, the designation "MWD" or "LWD" are used herein interchangeably, and either term refers measurement systems including, or methods conducted through use of, tools within or supported by a drillstring or other tubular within a well or borehole, as opposed to, for example, tools supported by a wireline or slickline.

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 1:
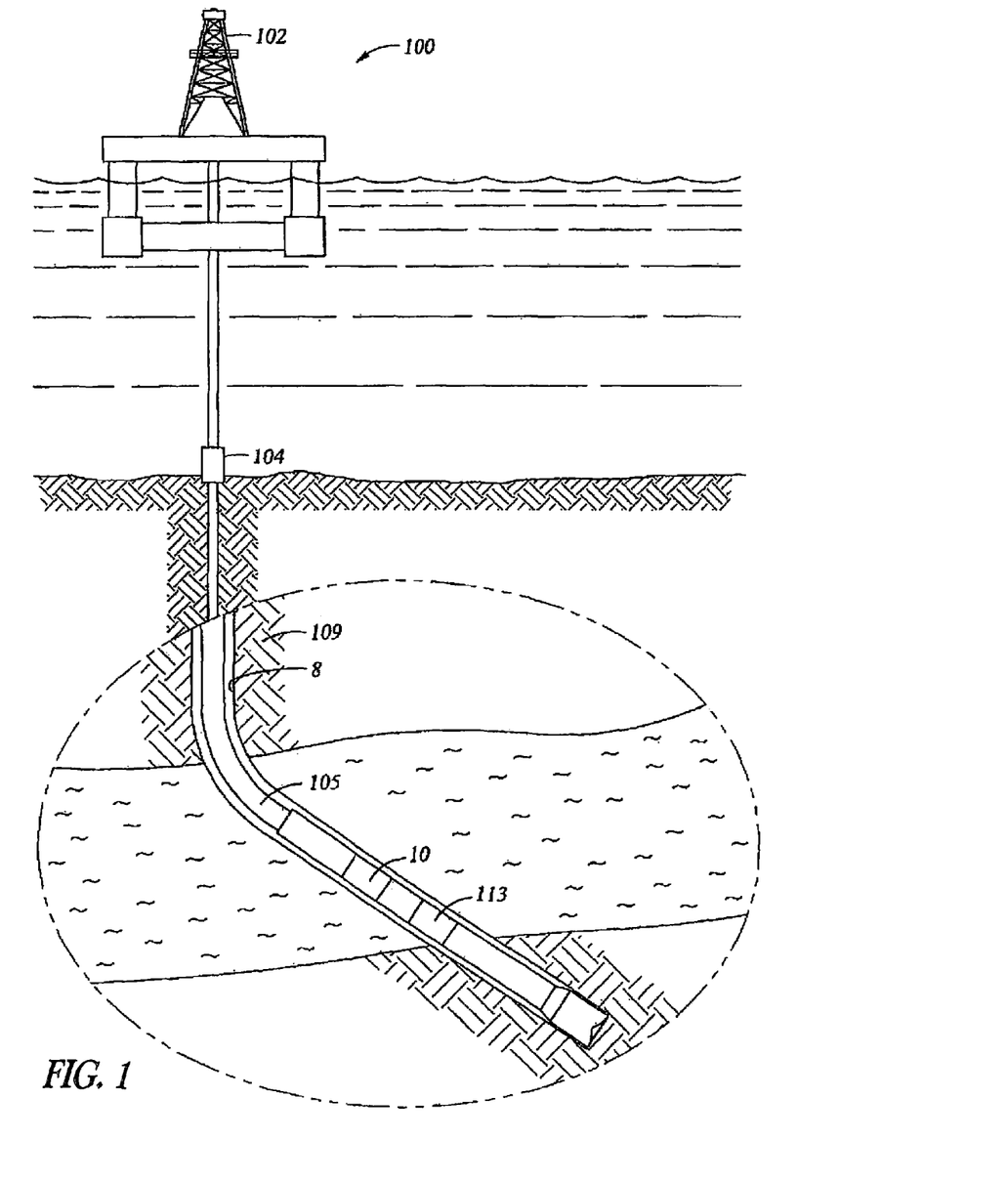
FIG. 1 illustrates a system for drilling including an example downhole tool including an apparatus for measuring linear displacement according to an embodiment of the present invention.

FIG. 1 illustrates a system 100 for drilling operations. The system 100 includes a drilling rig 102 located at a surface 104 of a well. The drilling rig 102 provides support for a drill string 105. The drill string 105 penetrates a rotary table for drilling a borehole 8 through subsurface formations 109. A downhole tool 113 may be any of a number of different types of tools including measurement-while-drilling ("MWD") tools, logging-while-drilling ("LWD") tools, etc.

The downhole tool 113 includes, in various embodiments, one or a number of different downhole sensors, which monitor different downhole parameters and generate data that is stored within one or more different storage mediums within the downhole tool 113. The downhole tool 113 can include a power source, such as a battery or generator. A generator could be powered either hydraulically or by the rotary power of the drill string. The generator could also be on the surface and the power supplied through conductor or conductors in a wireline or drillpipe.

The downhole tool 113 includes a downhole sampling device such as a formation tester tool 10, which can be powered by the power source. In one embodiment, the formation tester tool 10 may be mounted on a drill collar or wireline deployed. Thus, even though formation tester 10 is shown as part of drill string 105, the embodiments of the invention described below may be conveyed down borehole 8 via any drill string or wireline technology, as is partially described above and is well known to one skilled in the art.

Figure 2:
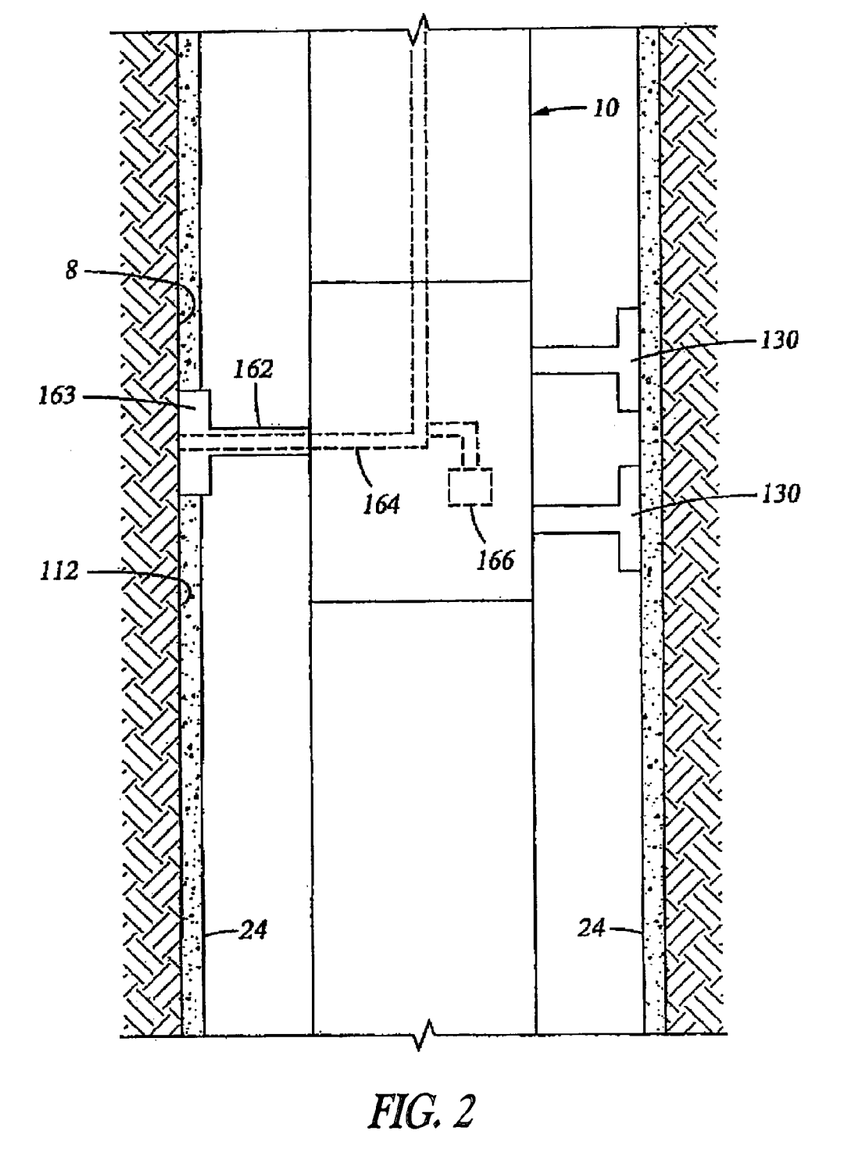
FIG. 2 schematically illustrates a formation tester tool according to an embodiment of the present invention.

FIG. 2 schematically illustrates the formation tester tool 10 in position to retrieve subterranean formation fluid from the borehole 8, in accordance with one embodiment. The formation tester tool 10 includes a probe 162 and a seal pad 163 that contacts the wall 112 of the borehole 8 through mud cake 24, isolating the borehole and sealing out mud flowing in the bore. In one option, the probe 162 includes a snorkel that extends into the formation to obtain formation fluid. The snorkel is, in one embodiment, fluidly connected to a main sampling flowline 164. The formation tester tool 10 optionally further includes one or more extendible backup pistons 130. A PVT system 166 can be included in the formation tester tool 10. PVT system 166 is in fluid communication with the probe 162 to receive a sample fluid from the probe 162. PVT system 166 is used for performing downhole fluid analysis, as will be discussed below.

Figure 3:
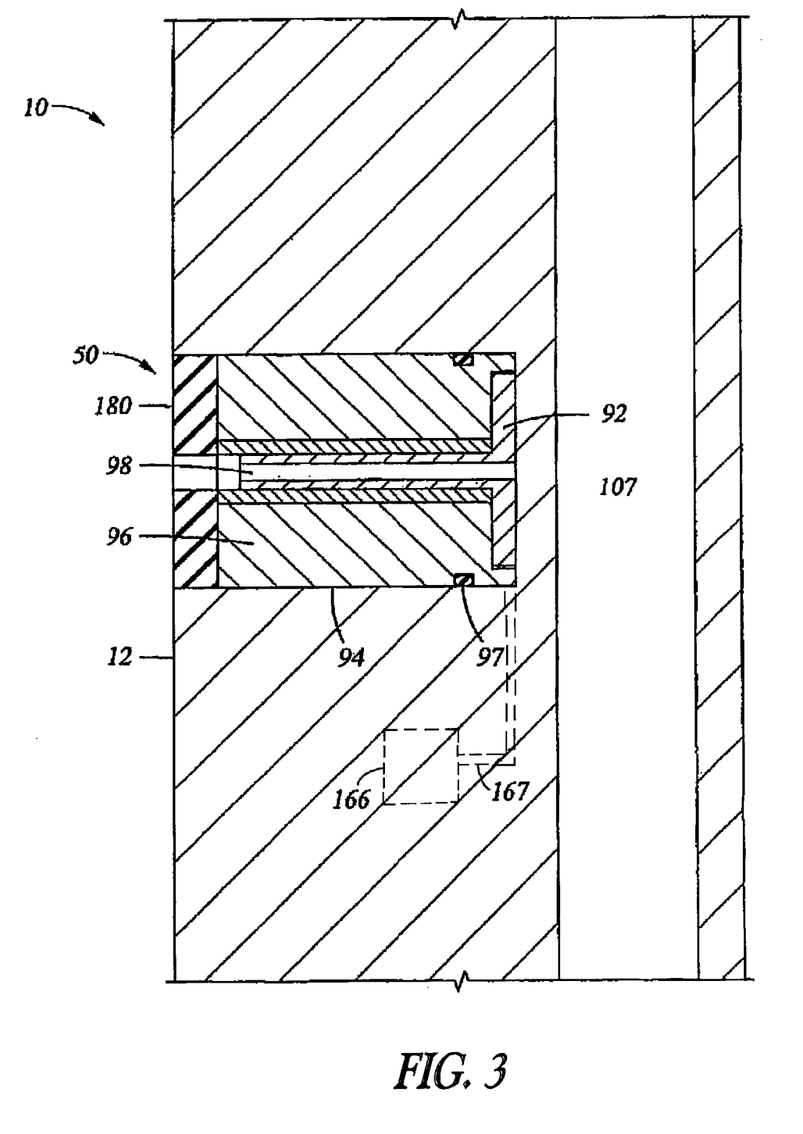
FIG. 3 shows further details of the formation tester tool of FIG. 2.
Figure 4:
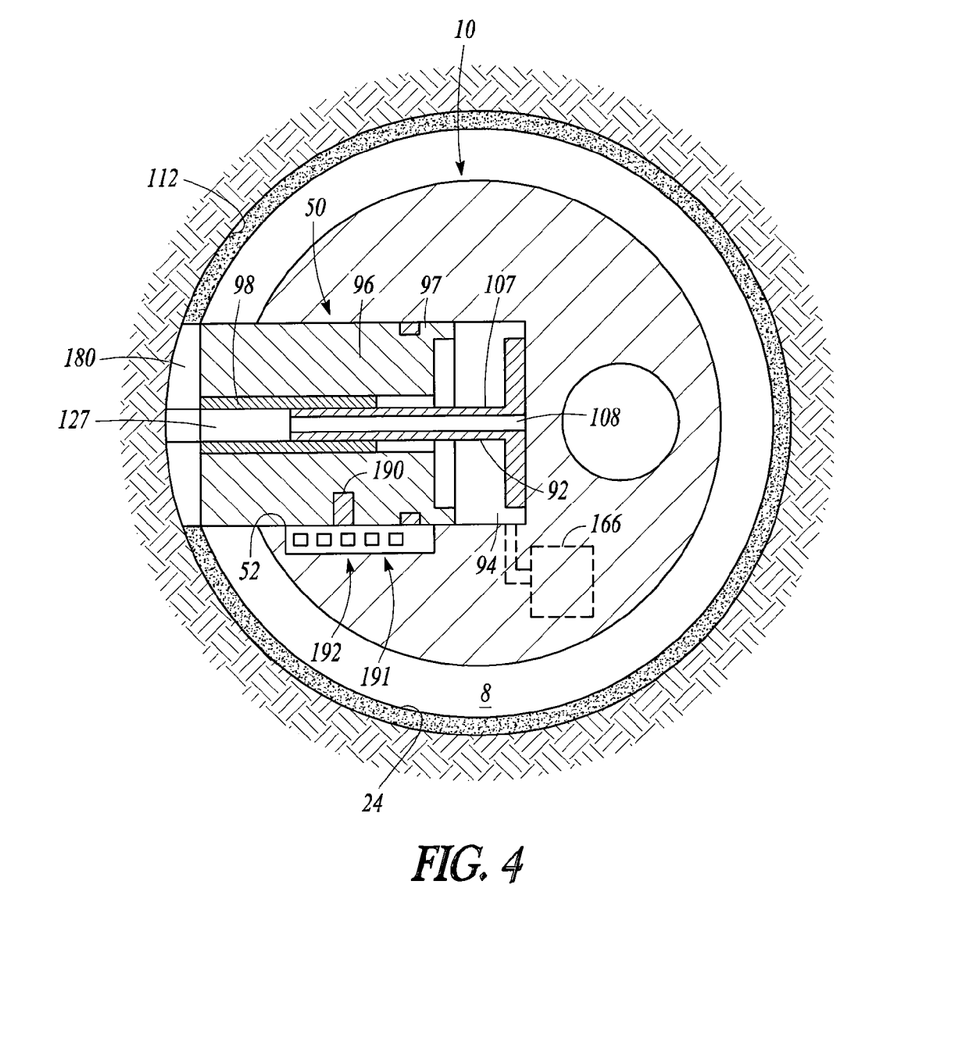
FIG. 4 shows further details of the formation tester tool of FIG. 2

FIGS. 3 and 4 show a schematic representation of a probe assembly 50 for formation tester tool 10, in accordance with one embodiment. FIG. 3 is side, section view of the probe assembly 50 in a retracted position, and FIG. 4 is a top, section view of the probe assembly 50 in an extended position. Also, in FIG. 4 formation tester tool 10 is shown disposed in a borehole 8 drilled into a formation. The wall 112 of borehole 8 is coated with mud cake 24 that is formed by the circulation of wellbore fluid through the wellbore.

Formation tester tool 10 has a substantially cylindrical body that is typical of tools used in downhole environments. Formation tester tool 10 includes hydraulic conduits and sample conduits therethrough.

Formation probe assembly 50 generally includes a stem 92, a piston chamber 94, a piston 96 adapted to reciprocate within piston chamber 94, a snorkel 98 adapted for reciprocal movement within piston 96, and a seal pad 180 located at an end of piston 96. Snorkel 98 includes a central passageway 127. Formation probe assembly 50 is configured such that piston 96 extends and retracts through aperture 52 of the formation tester tool 10. Stem 92 includes a tubular extension 107 having central passageway 108. Central passageway 108 is in fluid connection with fluid passageways leading to other portions of tester tool 10, including a draw down assembly, for example. Thus, a fluid passageway is formed from the formation through snorkel passageway 127 and central passageway 108 to the other parts of the tool.

Formation probe assembly 50 is assembled such that piston 96 includes shoulders 97 to allow hydraulic pressure to be used to extend and retract the piston. In use, snorkel 98 further extends into the formation wall to communicate with the formation fluid. Probe assembly 50 is extended by applying fluid pressure through hydraulic conduits so that hydraulic pressure is applied to shoulder 97. The pressure advances piston 96 and seal pad 180 toward the wall of the wellbore.

Seal pad 180 seals and prevents drilling fluid or other contaminants from entering the probe assembly 50 during formation testing. Typically, the pressure of the formation fluid is less than the pressure of the drilling fluids that are injected into the borehole. A layer of residue from the drilling fluid forms mud cake 24 on the borehole wall and separates the two pressure areas. Pad 180, when extended, contacts the borehole wall and, together with the mud cake, forms a seal. A portion of the formation sample fluid can be diverted to PVT system 166 via a fluid passageway 167.

Figure 5:
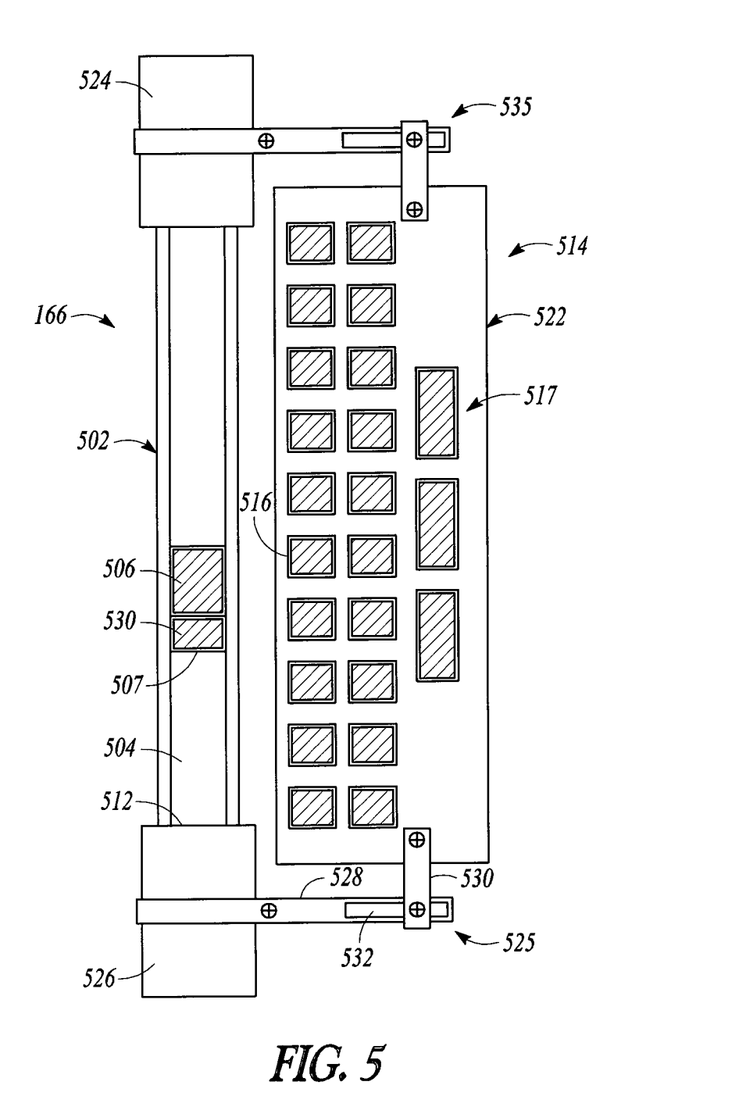
FIG. 5 illustrates a PVT measurement assembly according to an embodiment of the present invention.

FIG. 5 shows a schematic representation of PVT system 166, in accordance with one embodiment. PVT system 166 generally include a piston accumulator cell 502 that includes a piston chamber 504 to hold a portion of the sample fluid and a piston 506 that translates within the piston chamber 504. Piston 506 is movable within the piston chamber 504, using hydraulics for example, to vary a volume between one end 507 of the piston 506 and an end wall 512 of the piston chamber 504. The piston chamber 504 is configured to receive a sample fluid from a downhole source via passageway 167 (See FIG. 3), as discussed above. These small piston accumulator cells 502 require accurate and precise piston position measurement to provide accurate fluid analysis.

In this example, PVT system 166 includes a permanent magnet 530 located at the piston 506 and a magnetic field sensor 514, such as, for example, an array comprising a plurality of GMR (giant magnetoresistance) sensors 516 located to sense the location of the magnet 530 within the piston chamber 504.

One process for comparing signals from the array of GMR sensors 516 to determine piston 506 position in the chamber 504 can include a set-up where each sensor 516 in the sensor array is first calibrated. Calibration can involve adjusting for DC offset and sensitivity variations, either before digitizing with analog compensation circuitry or after digitizing with stored correction values. The sensor outputs can be digitized and their values corrected if not compensated for before digitizing. The acquired values are then compared with each other to determine which sensor 516 the magnet 530 is in closest proximity to. After determining the closest sensor 516, that sensor's output value is then used to compute the relative position of the piston 506 with respect to the closest sensor followed by an absolute position within the whole range of motion. Alternatively, readings from multiple sensors 516 may be used to further refine the distance measurements. In such applications, not only will the measurement from the identified closest sensor 516 be utilized; but that can be compared with one or more other measurements from other sensors, for example sensors on either side of the closest sensor, to confirm, or to further refine, the distance measurement. As just one example, a measurement from the closest sensor might be ratioed to the measurement from the next closest sensor to provide the position measurement, based on the known distances between those two sensors.

Volume change within chamber 504 can be calculated as $V = \pi r^2 d$ where 'd' is the piston's displacement. Alternatively, the volume could be looked up in a table of values listed by piston displacement within a specified resolution. Position, and therefore volume, accuracy and precision, will depend on the degree of calibration and the A-to-D converter resolution. Using GMR sensors allows for a high degree of sensitivity and precision without requiring the use of a large, strong magnet.

In one example, piston 506 can be molded from plastic and magnet 530 can be embedded within the plastic piston 506. The location of the magnet 530 allows for knowledge of the location of piston 506 and allows the system to ascertain the volume of the sample fluid within the piston chamber 504. The magnetic field sensor 514 helps to perform direct physical PVT measurements on a diverted and captured sample during a pump out down-hole. This enables the system obtain quantifiable PVT information from the PVT cell especially for compressibility and thermal expansion measurements. By performing downhole measurements of such information, better results can be obtained than transporting the sample above ground and doing the testing.

In one embodiment, magnetic field sensor 514 includes a circuit board 522 mounted to the PVT system accumulator 502 at first and second accumulator end caps 524, 526. A mounting bracket 525 includes a base bracket 528 connected to the accumulator end cap 526 and a secondary bracket 525 mounted to the circuit board 522. The base bracket 528 can include a slot 532. Slot 532 allows secondary bracket 530 to translate therein to allow the circuit board 522 to be moved closer or farther from the PVT system accumulator 502, as desired. The circuit board can include an array of GMR sensors 516 extending longitudinally across the bottom section of the circuit board and arrayed along the length of the piston chamber 504. Additionally, other portions of a magnetic field sensor assembly 517 can also be mounted to the circuit board 522. For example, assembly 517 can include circuitry to provide signal conditioning, conversion, switching, and communications to the surface.

In some embodiments, a circuit board is not utilized and the circuits and array of sensors 516 are embedded within the structure of the downhole tool.

In one example, the magnetic field sensor assembly 517 can include a GMR sensor circuit board 522 that can include a sensor and an amplifier stage. The amplifier would preferably be an instrumentation amp incorporating DC offset and gain. With the sensor's analog output signal appropriately conditioned, it could then be handled several different ways depending on the purpose of the sensor. For simple position indication, the signal could be supplied to a comparator to yield a digital level, or pulse, which could be monitored or used as a direct trigger in response to an object's linear or angular displacement. A series of pulses emanating from an array of sensors would allow tracking the linear or angular movement of an object within the resolution of the sensor spacing. For higher resolution position detection, the sensor's conditioned analog signal could be digitized and read by an application specific hardware circuit, microprocessor or DSP. A processor could compute, or determine through tables, a number of measurements based on position detection including linear or angular displacement, speed and acceleration, or volume—as in the case of a container with a movable object that is referenced to the volume and can be tracked by a GMR sensor. An example of a volume indicator would be tracking a piston within a cylinder of a PVT system. In downhole sensor applications the results could be used to affect some other downhole process or be transmitted to the surface using current telemetry schemes. Alternatively, the sensor's digitized output signal could be transmitted directly to the surface for processing.

In other examples, a magnetic field sensor such as sensor 514 can be configured to work on other movable members of the downhole tool. For example, referring again to FIG. 3, in one embodiment, piston 96 can include a magnet 190 attached to or embedded within the piston body. A magnetic field sensor 191, such as an array of GMR sensors 192 can be located along piston chamber 94. The magnetic field sensor 191 can be used, as discussed above, to determine the location of piston 96, using magnet 190, and also to determine the change in location of the piston 96 as the magnet travels along the piston chamber 94. As discussed previously, the speed or acceleration of the piston 96 can also be determined. In a similar embodiment, a magnet (not shown) can be attached to or embedded within snorkel 98 and a magnetic field sensor can be located near or within piston 96 to allow the location and change of position of the snorkel to be determined.

In other embodiments, other moving parts within downhole tools can also utilize the present system. For example, referring to FIG. 2, the movement of extendable backup pistons 130 can be determined. Also, other downhole technology such as movable sensor pads, and sensors attached to retractable linkages can be configured to utilize one or more of the magnetic field sensor systems described herein.

Figure 6:
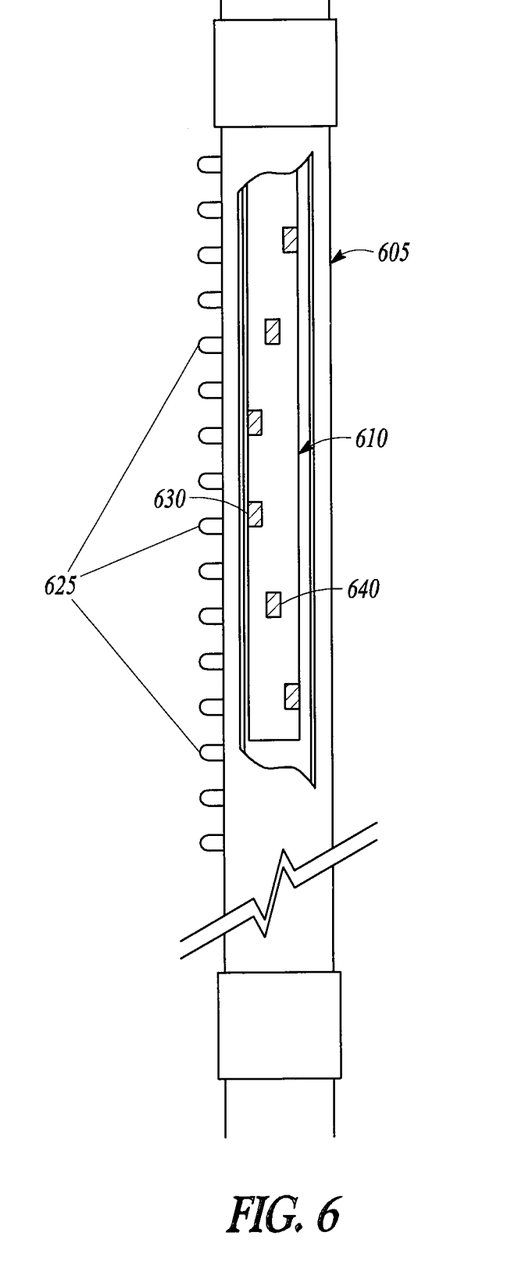
FIG. 6 illustrates a downhole tool within a casing, in accordance with one embodiment.

FIG. 6 illustrates a downhole tool 610 within a casing 605, in accordance with one embodiment. Casing 605 is located down a well bore. At least one magnet 625 is located along the length of casing 605. Magnets 625 can be located externally to the casing, inside the casing, or embedded in the walls of the casing. A magnetic field sensor assembly 630, including an array of GMR sensors 640, is attached to the body of the downhole tool 610. As the downhole tool 610 travels down the well bore within the casing 605, the magnetic field sensor assembly 630 moves relative to magnets 625, allowing for precision downhole depth and position and position change determinations.

In this example, the array of GMR sensors 640 is spirally placed around downhole tool 610. Such an arrangement of spirally, or circumferentially, placed array of sensors 640 serves two purposes. First, the tool 610's azimuth can be determined as long as the azimuth of the casing magnets 625 is known. Secondly, GMR sensors 640 placed around the circumference of the tool can ensure detection of the casing magnets 625 regardless of the tool 610's azimuth or its rotational position. GMR sensors 640 are highly anisotropic; a GMR sensor is only sensitive to the component of the magnetic field aligned with it.

In various embodiments of the systems and methods discussed herein, other magnetic field sensors can be utilized. For example, some embodiments can use AMR (anisotropic magnetoresistive) sensors, CMR (colossal magnetoresistance) sensors, and/or TMR (tunneling magnetoresistance) sensors. In some embodiments, the system can be used in an above ground environment, for measurement of the movement and location of pistons or other moveable members relative to a supporting structure.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
    a downhole PVT (pressure/volume/temperature) measurement assembly in a downhole environment, comprising:
    a PVT chamber;
    a PVT piston located within the PVT chamber, wherein the PVT piston is in fluid communication with formation fluid and movable in a direction relative to the PVT chamber to vary a volume of sample formation fluid in the PVT chamber;
    a magnetic field sensor assembly including a plurality of magnetic field sensors in spaced relation to one another;
    a magnet, wherein one of the magnet and the magnetic field sensor assembly is coupled to the PVT piston, and wherein the other of the magnet and the magnetic field sensor assembly is coupled to the PVT chamber; and
    a controller in communication with the downhole PVT measurement assembly, wherein the controller is configured to determine a relative position of the magnet with respect to the magnetic field sensor assembly and to determine the volume of the sample formation fluid within the PVT chamber based on the relative position and based on a compressibility of the sample formation fluid created by an ambient pressure of the downhole environment and a thermal expansion of the sample formation fluid created by an ambient temperature of the downhole environment.

2. The system of claim 1, wherein the magnet is located on the PVT piston and the magnetic field sensor assembly is located outside the PVT chamber, the plurality of magnetic field sensors located to sense the location of the PVT piston within the PVT chamber to ascertain the volume of the sample formation fluid within the PVT chamber.

3. The system of claim 2, wherein the magnetic field sensor assembly includes an array of GMR (giant magnetoresistance) sensors.

4. The system of claim 3, wherein the GMR sensors are located on a circuit board adjacent the PVT chamber.

5. The system of claim 2, wherein the system includes a downhole tool including a formation tester tool having a draw down piston assembly within the formation tester tool, and wherein the PVT measurement assembly is in communication with the draw down piston to receive the formation sample fluid from the draw down piston.

6. The system of claim 1, wherein the controller comprises a surface controller located at a surface of the earth and in wireline communication with the downhole PVT measurement assembly.

7. The system of claim 1, wherein the PVT piston comprises part of a draw down probe assembly.

8. The system of claim 1, wherein the PVT piston includes a seal pad.

9. The system of claim 1, wherein the system comprises a logging while drilling (LWD) system.

10. The system of claim 1, wherein the system comprises a wireline system.

11. A measurement system comprising:
    a PVT (pressure/volume/temperature) measurement assembly comprising: a PVT chamber;
    a PVT piston in fluid communication with formation fluid, the PVT piston located within the PVT chamber and movable within the PVT chamber to vary a volume between the PVT piston and an end wall of the PVT chamber, the PVT piston including a magnet having a location; and
    a plurality of magnetic field sensors coupled along the PVT chamber to sense the location of the magnet within the PVT chamber when the PVT measurement assembly is in a downhole well; and
    a surface controller located at a surface of the earth and in wireline communication with the PVT measurement assembly, the surface controller configured to determine the volume based on the location of the magnet within the PVT chamber and based on a compressibility of the sample formation fluid created by an ambient pressure of the downhole environment and a thermal expansion of the sample formation fluid created by an ambient temperature of the downhole environment.

12. The measurement system of claim 11, wherein the PVT measurement assembly is located within a downhole tool.

13. The measurement system of claim 12, wherein the PVT chamber is configured to receive a sample fluid from a downhole source.

14. The measurement system of claim 11, wherein the plurality of magnetic field sensors includes a GMR sensor.

15. The measurement system of claim 14, wherein the plurality of magnetic field sensors includes an array of GMR sensors located on a circuit board mounted adjacent the PVT chamber.

16. A downhole assembly comprising:
    a formation tester tool;
    a draw down piston assembly within the formation tester tool;
    a PVT (Pressure/Volume/Temperature) measurement assembly in communication with the draw down piston to receive a sample fluid from the draw down piston, the PVT measurement assembly including, a PVT chamber to hold a portion of the sample fluid when it is retrieved from a formation surrounding a well, a PVT piston located within the PVT chamber and movable within the PVT chamber to vary a volume between the PVT piston and an end wall of the PVT chamber, the PVT piston in fluid communication with the sample fluid, the PVT piston including a magnet, and a magnetic field sensor assembly, the magnetic field sensor assembly having a plurality of magnetic field sensors located to sense a location of the magnet within the PVT chamber; and a controller in communication with the PVT measurement assembly, the controller to ascertain the volume of the sample fluid within the PVT chamber while the tool is downhole based on a compressibility of the sample formation fluid created by an ambient pressure downhole and a thermal expansion of the sample formation fluid created by an ambient temperature downhole.

17. The downhole assembly of claim 16, wherein the plurality of magnetic field sensors includes a GMR sensor.

18. The downhole assembly of claim 17, wherein the plurality of magnetic field sensors are located on a circuit board mounted adjacent the PVT chamber.

19. A method comprising:

moving at least one magnet and at least one magnetic field sensor relative to each other in a downhole environment, wherein one of the magnet and the magnetic field sensor is coupled to a PVT (Pressure/Volume/Temperature) piston in fluid communication with a formation fluid and the other of the magnet and the magnetic field sensor is coupled to a PVT chamber;

determining, at a controller, a location or a change of location of the magnet relative to the magnetic field sensor while the tool is in the downhole environment; and determining a volume of a sample of formation fluid between the PVT piston and the PVT chamber based on the location or the change of location and based on a compressibility of the sample formation fluid created by an ambient pressure of the downhole environment and a thermal expansion of the sample formation fluid created by an ambient temperature of the downhole environment.

20. The method of claim 19, wherein the PVT piston and the PVT chamber comprise a PVT measurement assembly and the magnetic field sensor is located to determine the location of the magnet as the PVT piston moves.

21. The method of claim 19, wherein the controller comprises a surface controller located at a surface of the earth.

* * * * *